United States Patent
Li

(10) Patent No.: US 10,864,509 B2
(45) Date of Patent: *Dec. 15, 2020

(54) REGENERATED CATALYST COOLING METHOD

(71) Applicant: Qunzhu Li, Beichen Donglu (CN)

(72) Inventor: Qunzhu Li, Beichen Donglu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,425

(22) Filed: Mar. 16, 2020

(65) Prior Publication Data

US 2020/0215525 A1    Jul. 9, 2020

Related U.S. Application Data

(63) Continuation of application No. 15/541,380, filed as application No. PCT/CN2016/070251 on Jan. 6, 2016, now Pat. No. 10,625,253.

(30) Foreign Application Priority Data

Jan. 6, 2015    (CN) .......................... 2015 1 0004622

(51) Int. Cl.

| | | |
|---|---|---|
| *B01J 38/32* | (2006.01) | |
| *B01J 38/30* | (2006.01) | |
| *C10G 3/00* | (2006.01) | |
| *C10G 11/18* | (2006.01) | |
| *F28D 7/16* | (2006.01) | |
| *F28D 21/00* | (2006.01) | |

(52) U.S. Cl.
CPC ............... *B01J 38/32* (2013.01); *B01J 38/30* (2013.01); *C10G 3/60* (2013.01); *C10G 11/182* (2013.01); *F28D 7/1607* (2013.01); *F28D 2021/0022* (2013.01); *F28D 2021/0075* (2013.01)

(58) Field of Classification Search
CPC .. B01J 38/32; B01J 38/30; C10G 3/60; C10G 11/182; F28D 7/1607; F28D 2021/0022; F28D 2021/0075

USPC .......................................................... 165/110
See application file for complete search history.

(56) References Cited

U.S. PATENT DOCUMENTS

| | | | |
|---|---|---|---|
| 5,066,627 A | 11/1991 | Owen et al. | |
| 10,625,253 B2 * | 4/2020 | Li | ........................ B01J 8/1836 |
| 2012/0298556 A1 | 11/2012 | Li et al. | |
| 2018/0021769 A1 | 1/2018 | Li et al. | |

FOREIGN PATENT DOCUMENTS

| | | |
|---|---|---|
| CN | 101659601 A | 3/2010 |
| CN | 101769694 A | 7/2010 |
| CN | 103028450 A | 4/2013 |
| CN | 103113914 A | 5/2013 |
| CN | 203928823 U | 11/2014 |
| JP | H08173793 A | 7/1996 |

* cited by examiner

*Primary Examiner* — Edward M Johnson
(74) *Attorney, Agent, or Firm* — Duane Morris LLP

(57) ABSTRACT

The present invention provides a method of cooling a regenerated catalyst and a device thereof, which employs low-line-speed operation, wherein a range of the superficial gas velocity is 0.005-0.7 m/s, wherein at least one fluidization wind distributor is provided, wherein the main fluidization wind enters the dense bed layer of the catalyst cooler from the distributor, and the heat removal load of the catalyst cooler and/or the temperature of the cold catalyst is controlled by adjusting the fluidization wind quantity. The method and a device thereof of the present invention has an extensive application range, and can be extensively used for various fluid catalytic cracking processes, including heavy oil catalytic cracking, wax oil catalytic cracking, light hydrocarbon catalytic conversion and the like, or used for other gas-solid fluidization reaction charring processes, including residual oil pretreating, methanol to olefin, methanol to aromatics, fluid coking, flexicoking and the like.

17 Claims, 1 Drawing Sheet

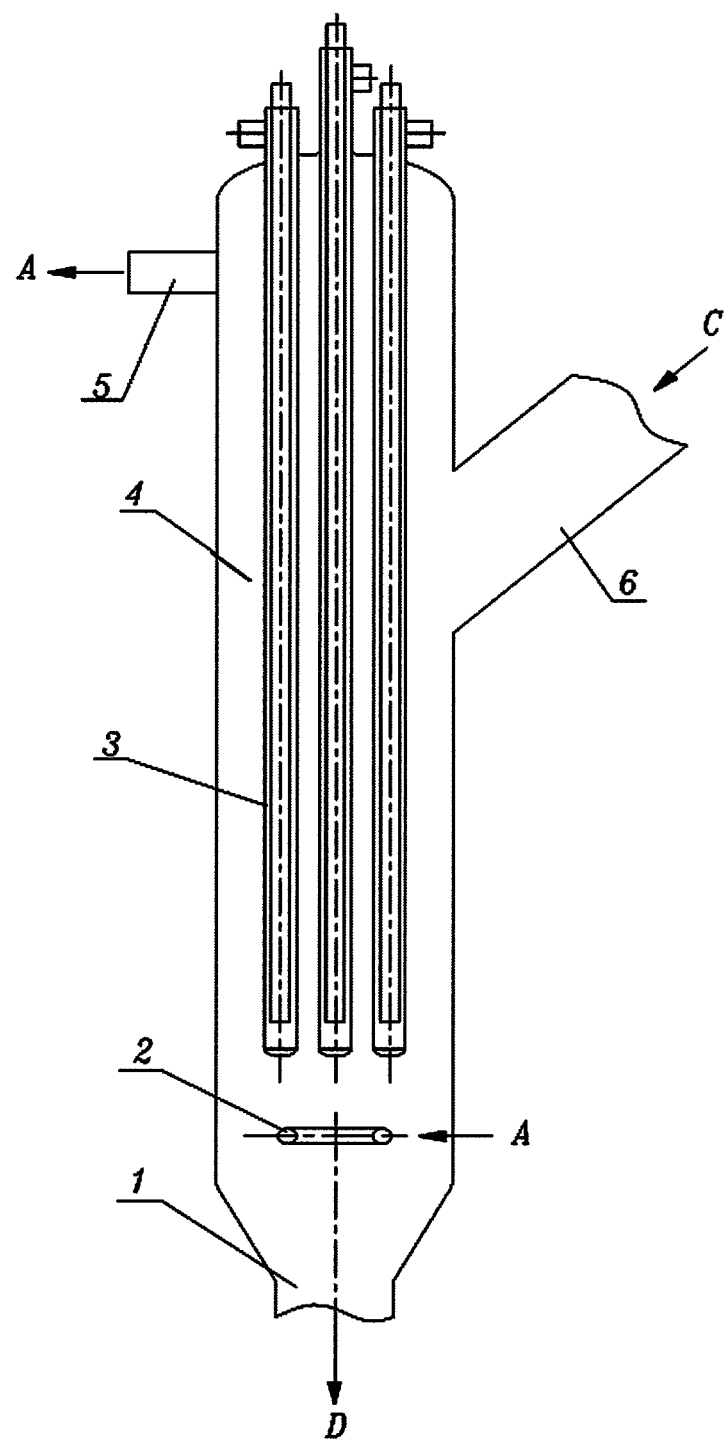

REGENERATED CATALYST COOLING METHOD

PRIORITY CLAIM AND CROSS-REFERENCE

The present application is a continuation of application Ser. No. 15/541,380, which is a national stage application, filed under 35 U.S.C. 371, of International Patent Application No. PCT/CN2016/070251, filed on Jul. 3, 2017, which claims the right of priority of Chinese Patent Application No. 201510004622.6, filed on Jan. 6, 2015.

BACKGROUND OF THE INVENTION

1. Field of the Invention

The present invention relates to a catalyst cooler, which belongs to the technical fields of petroleum processing and chemical industry.

2. Description of Related Art

Because gas-solids fluidized bed reactors are easy to control the reaction temperature and avoid hotspots in the bed layer, have good heat transfer and mass transfer characteristics, and can conveniently realize the continuous transporting of a large amount of solid particles, they are extensively applied in the homogeneous phase gas-solid reaction processes in fields such as petroleum processing, coal chemical industry and chemical engineering synthesis. In some gas-solids fluidized bed reactors that are exothermic, heat removers are frequently provided, for removing heat from the reactors, to satisfy the demands on the system thermal balance and controlling the reaction temperature.

As the deterioration and heavier trend of crude oil quality are increasingly aggravated, the blending ratio of residual oil from catalytic cracking keeps increasing. Heavy oil catalytic cracking, due to the heavy raw materials and high carbon residue values, has a rising coke yield, and the heat exceeds what the system needs, which results in overplus heat. Therefore, heavy oil catalytic cracking devices must be provided with a heat removing device, to remove the overplus heat, to maintain the heat balance between the two devices. The types of the conventional catalyst coolers for removing the overplus heat of the system in heavy oil catalytic cracking processes are various.

The air controlled internal recycle outer heat remover disclosed by Chinese patent CN101015901B and the air controlled external recycle outer heat remover disclosed by Chinese patent CN1023078C both comprise a shell, a telescopic heat exchange tube bundle, a fluidized air conduit, and a cold catalyst recurrent canal, and the heat removing quantities and the catalyst circulation rates are both controlled by the flow rates of the transporting wind and the fluidization wind.

Chinese patents CN1288932A and CN1288933A disclose new techniques of removing heat of transporting pipe of regenerated catalyst, which on the precondition of ensuring a regenerator temperature high enough and a favorable regeneration effect, reduce the temperature of the regenerated catalyst that enters the reactor, increase the warming-up temperature of the raw material oil, improve the atomization effect of the raw material, increase the catalyst-to-oil ratio, improve product distribution, and increase the liquid yield.

Although the conventional catalyst coolers can satisfy the requirements on heat removing of process engineering, they have the following drawbacks: 1. The adjusting range is small, and the operation in the low load area (heat removal load of below 35%) is difficult; 2. The fluidization is not stable, the heat removing tubes have serious wearing, and the service life is short; 3. The control loops are multiple, and the air quantities of the transporting wind and the fluidization wind are individually controlled, which has complicated operation; 4. At the catalyst inlet the gases and the catalyst are easy to laminate, which results in not good fluidization, causes a large temperature drop at the catalyst inlet, and reduces the heat removing efficiency; and 5. The transporting wind quantity that is used for maintaining the catalyst circulation is large, which has relatively high energy consumption.

SUMMARY OF THE INVENTION

An object of the present invention is to provide a method of cooling a regenerated catalyst and a device thereof (that is, a regenerated catalyst cooler), to solve the problems of the prior art of small adjusting range, heat removing tubes that are easy to broke, high consumption of boosting air and high energy consumption.

The Specific Technical Solution is in Detail Described as Follows:

A method of cooling a regenerated catalyst and a device thereof, characterized in that the regenerated catalyst cooler is of low line speed operation, has the range of its superficial gas velocity (the ratio of the flow rate of the fluidized medium to the empty tower cross-section of the device) of 0.005-0.7 m/s (preferably 0.01-0.3 m/s, and most preferably 0.05-0.15 m/s), and is provided with at least one fluidized medium distributor, wherein the fluidized medium enters the dense bed layer of the catalyst cooler from the distributor.

A method of cooling a regenerated catalyst, wherein a hot catalyst from the regenerator enters the catalyst cooler, flows downwardly through a dense phase fluidized bed, and is contact cooled by the pipe wall of a heat exchange tube, and a cold catalyst flows out from the bottom of the catalyst cooler; and meanwhile, the fluidized medium of the dense phase fluidized bed is introduced through at least one fluidized medium distributor, flows upwardly through the dense phase fluidized bed, and returns to the regenerator along with the gases that the hot catalyst particles take from the regenerator; wherein the catalyst cooler is of low line speed operation, and has the range of its superficial gas velocity (the ratio of the flow rate of the fluidized medium to the empty tower cross-section of the device) of 0.005-0.7 m/s (preferably 0.01-0.3 m/s, and most preferably 0.05-0.15 m/s).

A method of cooling a regenerated catalyst, comprising causing a regenerated catalyst and a fluidized medium to contact in the cooler, providing at least one distributor in a cooler, and feeding a fluidized medium from the distributor into a dense bed layer of the cooler, wherein a superficial gas velocity of the fluidized medium is 0.005 to 0.7 m/s.

A heat removal load of the catalyst cooler and/or a temperature of the cold catalyst is controlled by adjusting a flow rate of the fluidized medium and/or adjusting a flow rate of the cold catalyst that is leaving the catalyst cooler and/or another parameter.

The catalyst cooler is provided inside or outside a regenerator, and the catalyst cooler is provided with one, two or more catalyst outlets, for transporting a cold regenerated catalyst to the regenerator and/or reaction zones of one, two or more riser reactors and/or fluidized bed reactors.

The catalyst cooler is provided with a degassing (equilibration) tube or not, to realize the trapping and transporting of the big bubbles inside the outer heat remover and to improve the radial density distribution of the catalyst inside the cooler.

The fluidized medium may be air, steam or other gases or their mixtures, and the heat removing medium may be water, steam, air or other gases, oil products, or their mixtures. The rising (transporting) medium may be air, steam or other gases or their mixtures.

The present invention further provides a catalyst cooling device that the method of cooling a regenerated catalyst uses, which is generally a fluidized bed that is provided with a vertical heat exchange tube bundle. The fluidized bed is mainly provided with, from bottom to top, a catalyst outlet 1, a fluidized medium distributor 2, a heat exchange tube 3, a dense phase fluidized bed 4, a degassing equilibration orifice 5 and a catalyst inlet 6, wherein a plurality of heat exchange tubes 3 are vertically distributed to form a heat exchange tube bundle, extend from the top of the fluidized bed to the lower part of the fluidized bed, and are submerged in the dense phase fluidized bed 4.

The cooling method of regenerated catalyst and a device thereof of the present invention has an extensive application, and can be used for various fluidized catalytic cracking processes, including heavy oil catalytic cracking, wax oil catalytic cracking, light hydrocarbon (liquefied petroleum gas, C4, C5, gasoline, and the like) catalytic conversion and the like, and can be used for other gas-solid fluidization reaction charring processes, including residual oil pretreating, methanol to olefin (MTO, MTP), methanol to aromatics, fluid coking and flexicoking and the like. The regenerated catalyst that enters the catalyst cooler may be a regenerated catalyst or a regenerated catalyst without completed regeneration with any carbon content, or is a spent catalyst, contact agent or coking particles with any carbon content.

Catalyst coolers are a mature industrial device. The method of the present invention can employ various structure forms (such as upflow type and downflow type), and the catalyst transporting channel can employ various special connection structures (such as inner cycling pipe, and Y-type and U-type outer transporting (cycling) pipes). A degassing (equilibration) tube is provided or not. The specifications, quantity, structures and connection modes of the heat removing tubes can be set. A person skilled in the art is very familiar with the special structures, connection modes and operation and control processes, and that does not limit any special implementation of the concept of the present invention.

The Present Invention has the Following Advantageous Effects:

1) By using the operation of low-speed dense phase fluidized bed, the method can increase the driving force of the cycling system, overcome the system resistant force increasing caused by increasing circulation, and reduce the consumption of the transporting gas.

2) The increasing of the density of the cycling catalyst reduces the quantity of the air that is entrained by the cycling catalyst, thereby reducing the content of non-hydrocarbon gases such as nitrogen in the dry gas, increasing the calorific capacity of dry gas, and reducing the power consumption of rich gas compressor by approximately 10%.

3) The consumption of fluidization wind is reduced by approximately 80%, the overall consumption of boosting air is reduced by approximately 50%, and the power consumption of booster is reduced by approximately 50%.

4) By using low-speed dense bed operation, the shell side line speed of the outer heat remover is very low (0.01-0.03 m/s), and the catalyst particles have very small abrasion on the heat removing tube bundle, which facilitates prolonging the service life of the heat remover.

5) The fluidized bed of low line speed, compared with the fluidized beds of relatively high linear speeds, has more stable fluidization, and the probability of abnormal fluidization phenomena such as local dead bed and gas current bias is greatly reduced. The fluidization quality in the bed layer of the low-line-speed fluidized bed is apparently improved, which prevents the device damages caused by heat removing tube vibration and aggravated concentrated wear, and prolongs the service life of the devices.

6) The heat removal load has a large adjusting range, and the heat removal load can be flexibly adjusted in the range of 0-100%.

7) A degassing tube can be provided, which can realize the trapping and transporting of the big bubbles inside the outer heat remover, improve the radial density distribution of the catalyst inside the cooler, intensify the contact between the catalyst and the heat removing tubes (heat exchange tubes), and increase the heat exchange efficiency.

8) The high-temperature catalyst (hot catalyst) and the low-temperature catalyst (cold catalyst) that has been cooled both maintain a good low-speed uniformly fluidized state, which reduces the lamination of the gases and the catalyst, reduces the temperature drop of the high-temperature catalyst between the catalyst inlet and the catalyst outlet, increases the temperature of the catalyst inside the outer heat remover, and facilitates increasing the heat removing efficiency.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 is a typical embodiment of the regenerated catalyst cooler of the present invention. In the FIGURE: 1-catalyst outlet, 2-fluidized gas distributor, 3-heat exchange tube, 4-dense phase fluidized bed, 5-degassing equilibration orifice, 6-catalyst inlet.

DESCRIPTION OF THE PREFERRED EMBODIMENT(S)

In order to make the objects, the technical solutions and the advantages of the embodiments of the present invention clearer, the technical solutions of the embodiments of the present invention will be described clearly and completely below by referring to the FIGURE of the embodiments of the present invention. Apparently, the described embodiments are part of embodiments of the present invention, rather than all embodiments. On the basis of the described embodiments of the present invention, all the other embodiments that a person skilled in the art obtains without paying creative work are within the protection scope of the present invention.

Embodiment

FIG. 1 gives a typical implementation of the present invention. As shown in FIG. 1, the cooler is actually a fluidized bed that is provided with a plurality of vertical heat exchange tubes, and comprises a catalyst outlet (1), a fluidization wind distributor (2), heat exchange tubes (3), a dense phase fluidized bed (4), a degassing equilibration orifice (5), and a catalyst inlet (6). The heat exchange tubes (3) extend from the top of the cooler to the lower part of the cooler, and are submerged in the dense phase fluidized bed (4).

Hot catalyst particles C enter from the catalyst inlet (6), downwardly flow through the dense phase fluidized bed (4), and are contact cooled by the pipe wall of the heat exchange tube (3), and the cold catalyst D flows out from the catalyst outlet (1) at the bottom. The fluidized gas A of the dense phase fluidized bed (4) is introduced from the gas distributor (2) at the bottom, upwardly flows through the dense phase fluidized bed (4), passes through the degassing equilibration orifice (5) along with the extracted gas (the gas that is entrained from the regenerator by the hot catalyst particles C), and returns to the regenerator.

In addition, in order to increase the heat transfer area and reduce the size of the cooler, a heat transfer intensifying element may be welded on the heat exchange tube (3) (such as a fin or nail head heat transfer intensifying element, which is not shown in the FIGURE), to enhance the heat transfer effect and increase the heat exchange efficiency.

The differences between the present invention and the prior art are:

1) The line speed of the fluidization wind of the dense phase fluidized bed (4) is relatively low, and the range of the superficial operation line speed is preferably 0.01-3 m/s, and most preferably 0.05-0.15 m/s. When the catalyst is a regenerated catalyst, because it is to enter the riser reactor, the temperature of the cold regenerated catalyst is required to be more uniform and needs more precise controlling.

2) The temperature of the cold regenerated catalyst and/or the heat removal load of the catalyst cooler are controlled by adjusting the flow rate of the fluidization wind and/or the flow rate of the cold catalyst that is leaving the catalyst cooler and/or another parameter.

Comparative Embodiment

When an air-controlled-type outer heat remover of the prior art (Comparative Embodiment) is employed which employs the structure as shown in FIG. 1, and a relatively high fluidization wind line speed is employed, the superficial operation line speed is generally 0.5 m/s. The heat removal load of the catalyst cooler is controlled mainly by adjusting the flow rate of the lifting wind and in turn adjusting the flow rate of the cold catalyst that is leaving the catalyst cooler.

The height of the dense bed layer of the outer heat remover of the prior art is generally very high, and is generally in the range of 5-10 m. Because the overall pressure drop of the bed layer is relatively high, when the operation line speed is relatively high, the compression of the gases in the bed layer quite easily results in abnormal fluidization phenomena such as local dead bed and gas current bias.

Those abnormal fluidization phenomena will cause the degrading of the bed layer fluidization quality and the exacerbation of the heat transfer effect, and the results are large device vibration, shortened service life, a heat removal load that cannot meet the design requirements, and the like. If local dead bed exists in the heat remover, that may possibly result in that different heat removing tubes in the heat remover have different heat removal loads, and different thermal expansions of the heat removing tubes may possibly result in device damage, and when serious, even result in accidents of dry burning and damage of part of the heat removing tubes.

In addition, the gas current bias may possibly result in aggravated wearing of part of the heat removing tubes, which shortens their service lives.

Chill mold experimental study and industrial operation results indicate that, the low-line-speed fluidized bed of the present invention, compared with the fluidized beds of relatively high line speeds of the prior art, has more stable fluidization, and has no abnormal fluidization phenomena such as local dead bed and gas current bias. Therefore, the fluidization quality in the bed layer of the low-line-speed fluidized bed is apparently improved, which prevents the device damages caused by heat removing tube vibration and aggravated concentrated wear, and prolongs the service life of the device.

The present invention, compared with the prior art shown by the Comparative Embodiment (air-controlled-type outer heat remover), has the following technical effects:

1) The consumption of fluidization wind is reduced by approximately 80%, the overall consumption of boosting air is reduced by approximately 50%, and the power consumption of booster is reduced by approximately 50%.

2) The quantity of the air that is entrained by the cycling catalyst is reduced by approximately 35%, and the power consumption of rich gas compressor is reduced by approximately 10%.

3) The content of non-hydrocarbon gases such as nitrogen in the dry gas is approximately 35%, which increases the calorific capacity of FCC dry gas.

The invention claimed is:

1. A method of cooling a regenerated catalyst, comprising providing a catalyst cooler comprising a catalyst outlet, at least one fluidization medium distributor, heat exchange tubes, a dense phase fluidized bed, and a catalyst inlet;
providing hot catalyst particles, wherein the hot catalyst particles enter from the catalyst inlet, flow downwardly through the dense fluidized bed, and are cooled by pipe wall of the heat exchange tubes, and the cooled catalyst flows out from the catalyst outlet at its bottom; and
feeding a fluidized medium from the at least one fluidization medium distributor at the bottom, wherein the fluidized medium flows upwardly through the dense phase fluidized bed, along with a removed gas that is entrained by the hot catalyst particles from a regenerator, and returns to the regenerator.

2. The method of claim 1, further comprising:
adjusting a flow rate of the fluidized medium and/or adjusting a flow rate of the cooled catalyst leaving the catalyst cooler so as to control a heat removal load of the catalyst cooler and/or a temperature of the cooled catalyst.

3. The method of claim 1, wherein the catalyst cooler is provided inside or outside a regenerator; and the catalyst cooler is provided with one, two or more catalyst outlets, for transporting the cooled catalyst to the regenerator and/or transporting the cooled catalyst to reaction zones of one, two or more riser reactors and/or one, two or more fluidized bed reactors; wherein a superfacial gas velocity of the fluidized medium is in a range of from 0.005 m/s to 0.7 m/s.

4. The method of claim 3, wherein the superfacial gas velocity is in a range of from 0.01 m/s to 0.3 m/s.

5. The method of claim 3, wherein the superfacial gas velocity is in a range from 0.05 m/s to 0.15 m/s.

6. The method of claim 1, wherein the method is used for a fluid cracking process;
wherein the regenerated catalyst that enters the catalyst cooler is a regenerated catalyst or partially regenerated catalyst with any carbon content, or is a spent catalyst, or is contact agent or coking particles with any carbon content.

7. The method of claim 6, wherein the fluid cracking process is selected from the group consisting of heavy oil catalytic cracking, wax oil catalytic cracking, and light hydrocarbon catalytic conversion.

8. The method of claim 1, wherein the method is used for a gas-solid fluidization reaction charring process;
wherein the regenerated catalyst that enters the catalyst cooler is a regenerated catalyst or partially regenerated catalyst with any carbon content, or is a spent catalyst.

9. The method of claim 8, wherein the gas-solid fluidization reaction charring process is selected from the group consisting of residual oil pretreating, methanol to olefin, methanol to aromatics, fluid coking, and flexicoking.

10. The method of claim 2, wherein the method is used for a fluid cracking process or a gas-solid fluidization reaction charring process;
wherein the regenerated catalyst that enters the catalyst cooler is a regenerated catalyst or partially regenerated catalyst with any carbon content, or is a spent catalyst, or is contact agent or coking particles with any carbon content.

11. The method of claim 3, wherein the method is used for a fluid cracking process or a gas-solid fluidization reaction charring process;
wherein the regenerated catalyst that enters the catalyst cooler is a regenerated catalyst or partially regenerated catalyst with any carbon content, or is a spent catalyst, or is contact agent or coking particles with any carbon content.

12. The method of claim 4, wherein the method is used for a fluid cracking process or a gas-solid fluidization reaction charring process;
wherein the regenerated catalyst that enters the catalyst cooler is a regenerated catalyst or partially regenerated catalyst with any carbon content, or is a spent catalyst, or is contact agent or coking particles with any carbon content.

13. The method of claim 5, wherein the method is used for a fluid cracking process or a gas-solid fluidization reaction charring process;
wherein the regenerated catalyst that enters the catalyst cooler is a regenerated catalyst or partially regenerated catalyst with any carbon content, or is a spent catalyst, or is contact agent or coking particles with any carbon content.

14. The method of claim 10, wherein the fluid cracking process is selected from the group consisting of heavy oil catalytic cracking, wax oil catalytic cracking, and light hydrocarbon catalytic conversion; or the gas-solid fluidization reaction charring process is selected from the group consisting of residual oil pretreating, methanol to olefin, methanol to aromatics, fluid coking, and flexicoking.

15. The method of claim 11, wherein the fluid cracking process is selected from the group consisting of heavy oil catalytic cracking, wax oil catalytic cracking, and light hydrocarbon catalytic conversion; or the gas-solid fluidization reaction charring process is selected from the group consisting of residual oil pretreating, methanol to olefin, methanol to aromatics, fluid coking, and flexicoking.

16. The method of claim 12, wherein the fluid cracking process is selected from the group consisting of heavy oil catalytic cracking, wax oil catalytic cracking, and light hydrocarbon catalytic conversion; or the gas-solid fluidization reaction charring process is selected from the group consisting of residual oil pretreating, methanol to olefin, methanol to aromatics, fluid coking, and flexicoking.

17. The method of claim 13, wherein the fluid cracking process is selected from the group consisting of heavy oil catalytic cracking, wax oil catalytic cracking, and light hydrocarbon catalytic conversion; or the gas-solid fluidization reaction charring process is selected from the group consisting of residual oil pretreating, methanol to olefin, methanol to aromatics, fluid coking, and flexicoking.

* * * * *